May 14, 1940.  J. VON S. FINNE  2,200,773
FERTILIZER DISTRIBUTOR
Filed May 27, 1937  3 Sheets-Sheet 1
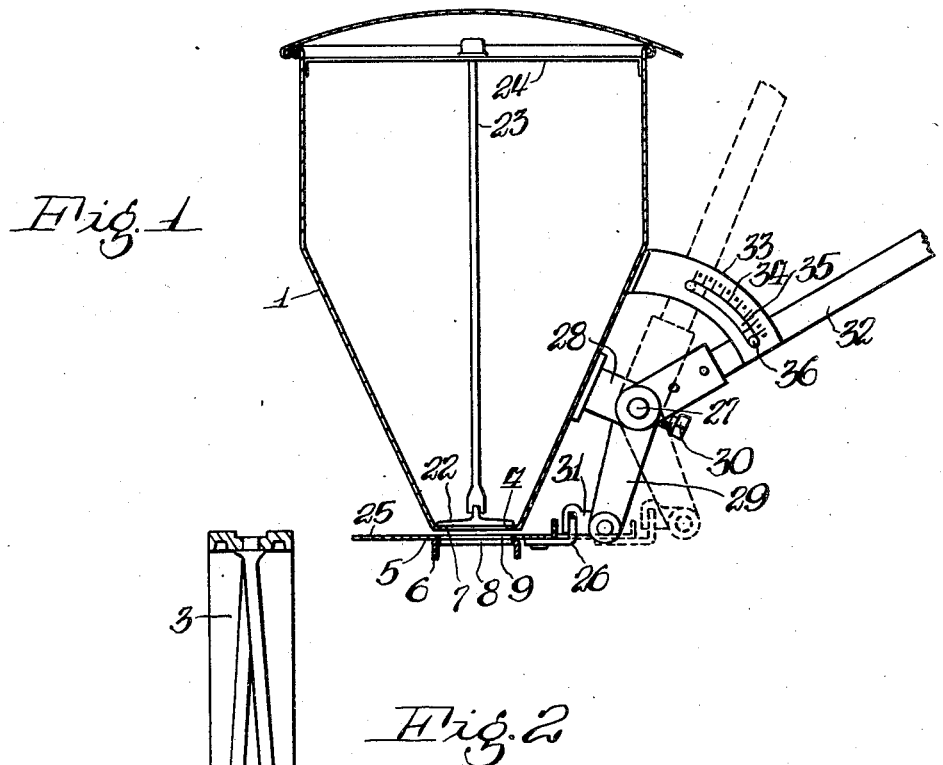
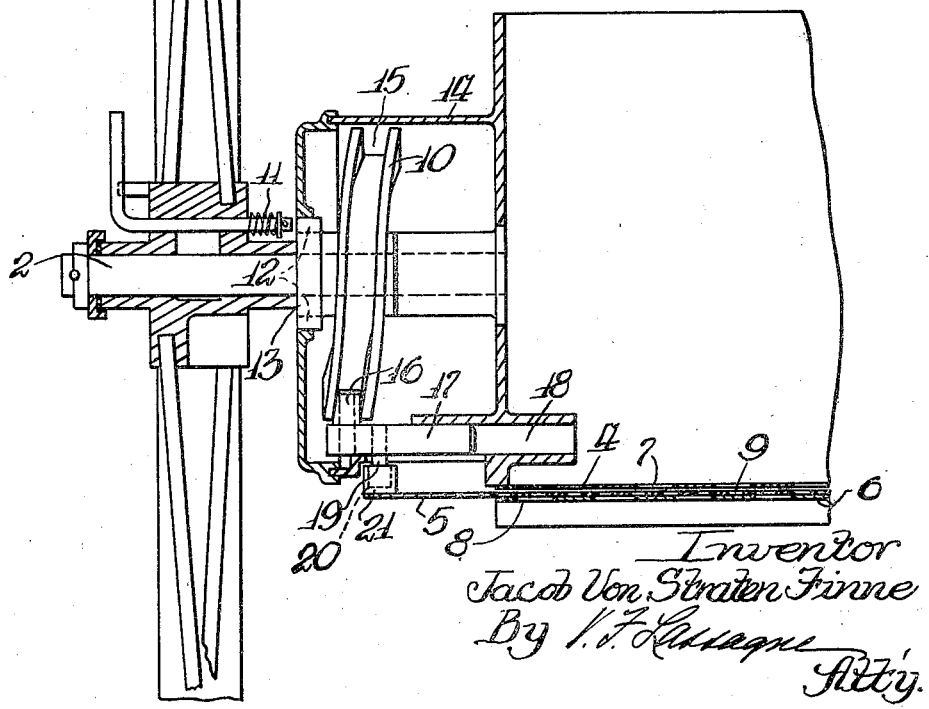

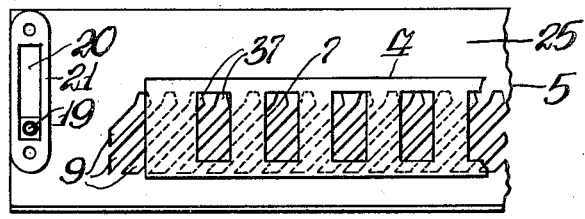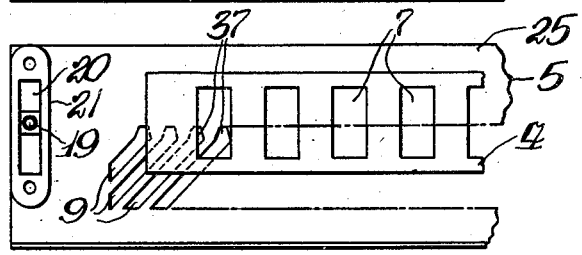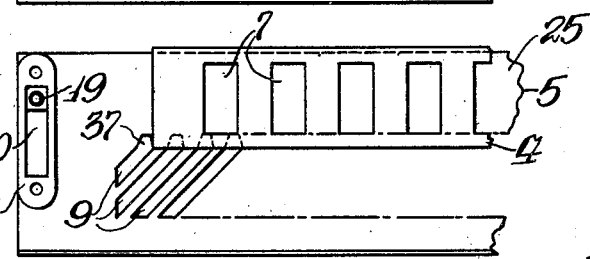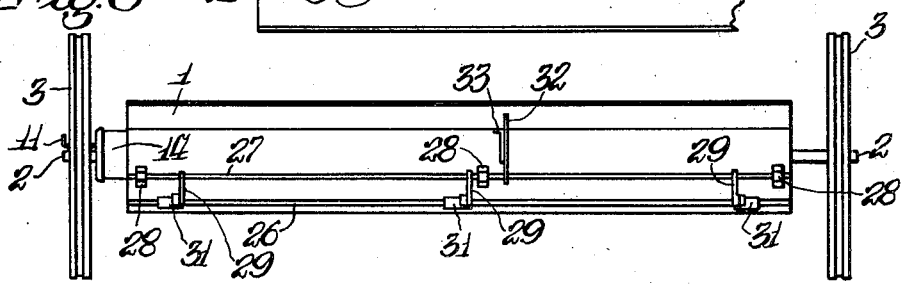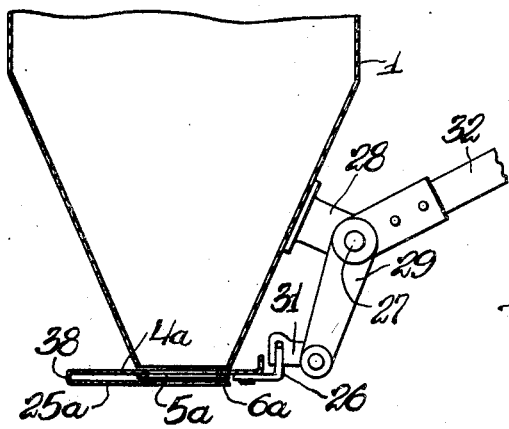

May 14, 1940.  J. VON S. FINNE  2,200,773
FERTILIZER DISTRIBUTOR
Filed May 27, 1937   3 Sheets-Sheet 3
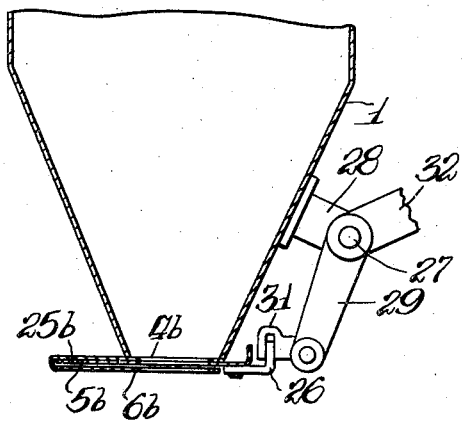
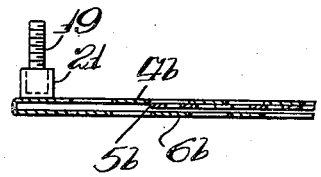
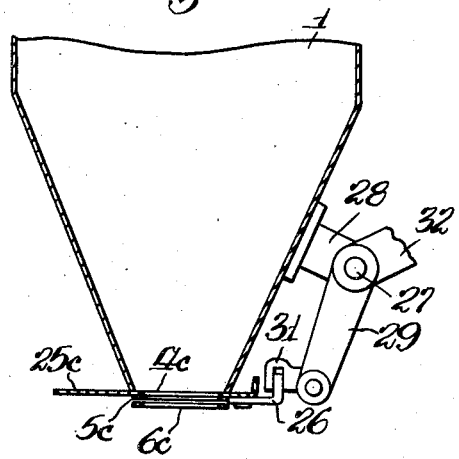
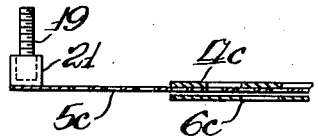
Inventor
Jacob Von Straten Finne
By V. F. Lassagne
Att'y.

Patented May 14, 1940

2,200,773

UNITED STATES PATENT OFFICE 2,200,773

FERTILIZER DISTRIBUTOR

Jacob von Straten Finne, Norrkoping, Sweden, assignor to International Harvester Company, a corporation of New Jersey Application May 27, 1937, Serial No. 145,012
In Germany October 28, 1936

7 Claims. (Cl. 221—126)

The present invention relates to machines for distributing artificial fertilizers or other substances over the land, and it more specifically relates to that type of such machines which includes a long narrow box or hopper arranged across the machine between the road wheels and having the hopper bottom formed as, or provided with, a plurality of grid elements, disposed one above the other, wherein one or more of these grid elements move to and fro in the long dimension of the hopper relative to a stationary grid element or elements in a manner to bring the openings in the former grids in and out of register with the openings in the stationary grid or grids, so that the fertilizer is fed from the hopper to the land.

In such machines it is necessary to provide means for varying the amount of fertilizer to be distributed, and to this end arrangements are known whereby the amount of movement; that is, the length of the working stroke of the reciprocating grid element or elements may be altered so that, when the stroke is lessened, the amount of fertilizer delivered by the machine is reduced, and vice versa. This arrangement has the drawback that, when the stroke of the reciprocating grid is reduced to a small amount such as required when working with certain kinds of chemical fertilizers, the movement of the grid is insufficient to insure regular distribution.

In a further known device to permit of a variation of the amount of fertilizer to be distributed, means are provided to alter the size of the slots in the, or one of the stationary grid elements. Such an arrangement is undesirable because it entails the provision of a special shut-off plate or the like in contact with the fertilizer, thus complicating the construction of the machine and increasing the number of parts to be cleaned; also, the cleaning of all parts of such machines which come in contact with chemical fertilizers has to be frequently and thoroughly carried out, owing to the corrosive effect and sticky or pasty nature of some of said fertilizers, and it is consequently desirable to keep the number of such parts as low as possible.

The principal object of the present invention is to vary the amount of fertilizer to be distributed by providing one of the grid elements with a solid, unslotted or imperforate portion extending along the whole of one side, which portion may have movement relative to the remaining grids in a manner to cover either partially or entirely the slots in the remaining grids, so that the distribution of the fertilizer may be varied as required, or entirely cut off.

An important object is to provide for altering the size of the slots through which the fertilizer is fed without interfering with the stroke of the reciprocating grid or grids.

Another object is to make provision for movement of the adjustable grid so that the unslotted or imperforate portion entirely covers the slots in the remaining grids, in which case the bottom of the hopper is completely closed and no fertilizer can be fed from or can escape from the hopper.

Another object of the invention is to provide for construction wherein movement of the adjustable grid to cover the slots in the other grid or grids is obtained by means of a lever mounted on one of the hopper walls.

Still another object is to provide for construction wherein a reciprocating grid element is formed with the solid unslotted plate portion which is to be adjusted to cover the slots in a stationary grid or grids, the mechanism which effects the drive of this grid being constructed in such a manner that the stroke of the grid is maintained constant for all adjustments.

And still another object is to provide for a construction wherein, in certain instances, movement of the lever moves the grid substantially at right angles to its reciprocating movement.

In order that the invention may be clearly understood, reference is now made to the accompanying drawings wherein a preferred form of the invention is shown in some detail, while alternative forms are shown schematically.

In the drawings,

Figure 1 is a sectional side view of the hopper of a distributor of a preferred form wherein a reciprocating grid element moves between two fixed grid elements, and the view further shows the lever for adjusting the reciprocating grid element;

Figure 2 is a rear view of a portion of the machine corresponding to Figure 1, showing a portion of the hopper and of the grid elements and illustrating a means for driving the reciprocating grid element;

Figures 3, 4 and 5 are plan views of portions of the grids to illustrate the way in which the unslotted part of the adjustable grid may be drawn across the other grids to cover either partially or entirely the feed slots in the latter;

Figure 6 is a rear view on a reduced scale of the complete machine to show the location of the parts associated with the adjustment of the adjustable grid;

Figure 7 is a side view of the hopper in an alternative arrangement where a pair of reciprocating grids are provided disposed one each side of a fixed grid;

Figure 8 is a rear view of a portion of the grids and the driving means for the same to correspond with Figure 5; and, Figures 9, 10, 11 and 12 show further alternative arrangements wherein a fixed grid is provided with the solid plate part and is used for the adjusting means for varying the amount of fertilizer to be distributed.

The distributor comprises a long, narrow box or hopper 1 having the lower part of the front and rear walls sloping towards each other, as shown in Figure 1. The hopper is carried by stub axles 2 supported on road wheels 3. In a preferred form of the invention, as shown especially in Figures 1 and 2, the base of the hopper is provided or formed with three grid elements 4, 5 and 6, which may be supported relative to the hopper in any convenient manner. The upper and lower elements 4 and 6 are fixed grids and are provided with a series of transverse slots 7 and 8 extending across the narrow dimension of the grid, as indicated in Figures 3 to 5. The slots in the grid 4 are in staggered relation to those in grid 6, as indicated in Figure 2.

The center grid element 5 is provided with a series of slanting slots or openings 9, and is adapted to be moved to and fro in the long dimension of the hopper. By this means the granular or crystalline fertilizer or other substance placed in the hopper is fed through the slots 7 into the slots 9, whence it is carried to the lower slots 8 and falls on the ground.

The to and fro feed movement is imparted to the grid 5 by means of a reciprocating means or cam wheel 10 carried on the stub axle 2, as best shown in Figure 2. This wheel may be coupled to one of the road wheels 3 to partake of its rotation by means of a latch device 11, which springs into a hole 12 provided in a flange 13 integral with the cam wheel 10. The cam wheel and the related parts are associated with the frame of the machine, being conveniently housed in a casing 14 disposed at one side of the hopper. The cam wheel is formed with an annular groove 15 adapted to receive a stud 16 secured on a guide-pin 17, which moves to and fro in a tubular guide 18. Screwed into the lower part of the guide-pin 17 adjacent the stud 16 is a second stud 19, the head of which can slide in a groove 20 formed in a guide member or means 21 secured in any convenient manner on the upper surface of one end of the grid 5. When the cam wheel 10 is coupled to the road wheel 3 by means of the latch 11, the stud is guided in the groove 15 to reciprocate the guide-pin 17, causing a like reciprocating movement of the grid 5 relative to the stationary grids 4 and 6. A reciprocating agitator member 22 may be, as usual, provided to move over the upper stationary grid 4, and it may be driven from the cam wheel 10 or other means, as desired. Rods 23 suspended from transverse rods 24 secured at opposite sides of the hopper may be provided to hold the agitator in place.

According to the invention, the center reciprocating grid 5 is provided along one edge with a solid unslotted or imperforate portion 25 which, when the distributor is adjusted to feed out the maximum amount of fertilizer, etc., projects outside the base of the hopper, as shown in Figure 1. This portion may, however, be drawn between the fixed slotted grids 4 and 6, in a manner now to be described to lessen the amount of feed.

Secured on the edge of the grid 5 remote from the unslotted part 25 is an angle bracket member having an upstanding edge 26. A shaft 27 is secured by means of brackets 28 to the rear wall of the hopper, and at intervals along this shaft downwardly depending lever-arms 29 are secured (see Figures 1 and 6). These lever-arms are secured on the shaft by means of set screws 30 to provide for adjustment of the arms with the shaft about its axis in the brackets 28. Pivotally carried on the ends of these lever-arms 29 are hook-members 31 which are adapted to hook over the upstanding edge 26 of the angle bracket secured to the grid 5. About midway on the shaft 27, a lever 32 is secured, by means of which the shaft 27 may be partially rotated. Adjacent the lever a bracket 33, projecting from the rear wall of the hopper, is provided, which may be marked with a suitable scale 34, the bracket including an arcuate groove 35 adapted to receive a pin 36 carried by the lever 32.

As will now be understood from inspection of Figure 1, a movement of the lever 32 will cause a rotation of the shaft 27, thus actuating the lever-arms 29 and causing them to pull or push on the grid 5. When the lever is moved, for instance towards the hopper, the unslotted part 25 formed along the edge of the grid will be drawn between the grids 4 and 6 to cover the feed slots therein.

Referring to Figures 3, 4 and 5, in the position of the grids shown in Figure 3, the lever 32 and the grid 5 are in the position indicated in full lines in Figure 1, so that the slots are wholly exposed and the feed of the fertilizer, etc. from the hopper is at its maximum. As the lever is moved towards the hopper, the unslotted part of the grid 5 is drawn within the grids 4 and 6, so covering the slots 7 and 8 that their effective area is reduced and the feed is lessened. Figure 4 shows the position where the slots 7 and 8 are partially covered. When the lever 32 is moved to the position shown in dotted lines in Figure 1, the unslotted part 25 on the grid is wholly drawn within the grids 4 and 6 and the slots therein are entirely covered, as shown in Figure 5, so that distribution is completely arrested.

As may be seen further from Figures 3, 4 and 5, the stud 19, which effects the reciprocation of the grid 5, moves in the groove 20 as the grid is adjusted in the manner just described, so that the grid maintains a constant stroke for all adjustments. When the distribution slots are entirely covered, as shown in Figure 5, the reciprocation of the grid may be arrested by uncoupling the cam wheel 10 from the road wheel.

In order to insure that distribution continues regularly, even when the slots in the grids 4 and 6 are almost entirely covered, the ends of the slots 9 in the reciprocating grid 5 are cut, as indicated at 37, thus providing an edge acting on the substance to be distributed at each stroke of the screen in both directions.

In Figures 7 and 8 an alternative arrangement is illustrated. In this case a fixed grid 5a is disposed between a pair of reciprocating grids 4a and 6a. The latter are formed with the solid unslotted portion 25a, and are joined together as indicated at 38. The grids 4a and 6a may be driven just as described for Figure 1 and as shown in Figure 7. The part 25a may be drawn over the slots in the grid 5a by the lever 32 just as described with reference to Figures 1 to 5, to adjust or arrest distribution. Alternatively, the reciprocating grids may be connected together at their rear edges, in which case a portion 25a is necessary on only the upper grid 4a. In still another form of this arrangement, the reciprocating grids may be formed separately, each having its individual driving connection and one of the grids having an unslotted portion and being connected to the adjusting lever.

In the arrangement shown in Figures 9 and 10, a fixed screen is used for adjusting purposes. The grids 4b and 6b are the reciprocating grids arranged as described with reference to Figures 7 and 8, while the middle fixed grid 5b is formed with the unslotted part 25b, which may be drawn across the slots in the reciprocating grids by means of the lever 32.

In Figures 11 and 12, the arrangement of the grids is as shown in Figure 1, and the upper stationary grid 4c is provided with the unslotted, adjustable portion 25c; that is, Figures 1 and 2 show that the upper and lower grids 4 and 6 are stationary, and the intermediate grid 5 is both adjustable and capable of reciprocation, whereas Figures 11 and 12 show that the upper grid 4c is adjustable, the lower grid 6c is fixed, and the intermediate grid 5c is capable of reciprocation.

Having now particularly described and ascertained the nature of the said invention and in what manner it is to be performed, what I claim is:

1. In a fertilizer distributor having a hopper, a pair of spaced parallel grids fixed at the bottom of said hopper and having openings therethrough, an intermediate grid mounted for reciprocation between said spaced grids longitudinally of the hopper and having openings therethrough, said intermediate grid being mounted also for movement between the spaced grids in a direction transversely of the hopper, means for reciprocating the intermediate grid to permit intermittent registry of the openings in the intermediate and one of the other grids, and means for moving said intermediate grid transversely, the combination with the grids of an imperforate portion on said intermediate grid adapted to be positioned by the last named means at various points with respect to the openings in the fixed grids to partially or entirely shut off said openings.

2. In a fertilizer distributor, the combination of a hopper, a pair of spaced parallel grids fixed at the bottom of said hopper and having openings therethrough, an intermediate grid mounted for reciprocation between said spaced grids longitudinally of the hopper and having openings therethrough, said intermediate grid being mounted also for movement between the spaced grids in a direction transversely of the hopper, means for reciprocating the intermediate grid to permit intermittent registry of the openings in the intermediate and one of the other grids, means for moving said intermediate grid transversely, and an imperforate portion on said intermediate grid adapted to be positioned by the last named means at various points with respect to the openings in the fixed grids to partially or entirely shut off said openings.

3. In a fertilizer distributor having a hopper, a pair of spaced parallel grids mounted at the bottom of said hopper for movement longitudinally and transversely thereof and having openings therein, an intermediate grid fixed between the spaced grids and having openings therethrough, means for moving said spaced grids longitudinally to permit intermittent registry of the openings therein with the openings in the fixed grid, and means for moving said spaced grids transversely, the combination with the grids of an imperforate portion on one of the spaced grids adapted to be positioned by the last named means at various points with respect to the openings in the fixed grid to partially or entirely shut off said openings.

4. In a fertilizer distributor, the combination of a hopper, a pair of spaced parallel grids mounted at the bottom of said hopper for movement longitudinally and transversely thereof and having openings therein, an intermediate grid fixed between the spaced grids and having openings therethrough, means for moving said spaced grids longitudinally to permit intermittent registry of the openings therein with the openings in the fixed grid, and means for moving said spaced grids transversely, and an imperforate portion on one of the spaced grids adapted to be positioned by the last named means at various points with respect to the openings in the fixed grid to partially or entirely shut off said openings.

5. In a fertilizer distributor including a hopper supported on a frame having ground engaging wheels, a grid having openings therein and fixedly disposed at the bottom of the hopper, and a second grid having openings therein and mounted adjacent the fixed grid for reciprocation longitudinally and for movement transversely of the hopper, the combination with the movable grid of an imperforate portion thereon, means driven by one of the wheels for reciprocating said movable grid, means carried by the hopper and operable to position the movable grid transversely at various points with respect to the openings in the fixed grid whereby the aforesaid imperforate portion partially or entirely shuts off said openings, and guide means carried by said movable grid and engaging the wheel-driven means for maintaining the reciprocation stroke of the movable grid at any of its transverse positions in the hopper.

6. In a fertilizer distributor including a hopper supported on a frame having ground-engaging wheels, a grid having openings therein and fixedly disposed at the bottom of the hopper, and a second grid having openings therein and mounted adjacent the fixed grid for reciprocation longitudinally and for movement transversely of the hopper, the combination with the movable grid of an imperforate portion thereon, means driven by one of the wheels for reciprocating said movable grid, said means including a cam wheel having an annular groove a reciprocal slide member associated with the aforesaid frame and engaging the groove in the cam wheel, a guide member carried by the movable grid and having a slot therein at right angles to the direction of reciprocation, a member carried by the slide member and engaging the slot in the guide member, and means carried by the hopper and operable to position the movable grid transversely at various points with respect to the openings in the fixed grid whereby the aforesaid imperforate portion partially or entirely shuts off said openings, the aforesaid guide member on the movable grid permitting transverse positioning of said movable grid without interfering with the stoke of reciprocation thereof.

7. In a fertilizer distributor, the combination of a hopper, a pair of grids having openings therein disposed at the bottom of said hopper, one of said grids being fixed and the other movable longitudinally and transversely of the hopper, means for moving said movable grid longitudinally to permit intermittent registry of the openings in the grids, an imperforate portion on said movable grid, and means for moving said movable grid transversely to position the imperforate portion at various points with respect to the openings in the fixed grid to partially or entirely shut off said openings.

JACOB von STRATEN FINNE.